(12) United States Patent
Levi Montalcini

(10) Patent No.: US 7,661,072 B2
(45) Date of Patent: Feb. 9, 2010

(54) ACCELERATED SCROLLING

(75) Inventor: Alessandro Levi Montalcini, Turin (IT)

(73) Assignee: Microsoft Corporation, Redmond, WA (US)

(*) Notice: Subject to any disclaimer, the term of this patent is extended or adjusted under 35 U.S.C. 154(b) by 132 days.

(21) Appl. No.: 11/002,591

(22) Filed: Dec. 3, 2004

(65) Prior Publication Data

US 2005/0097467 A1    May 5, 2005

Related U.S. Application Data

(62) Division of application No. 09/407,946, filed on Sep. 29, 1999, now Pat. No. 6,865,718.

(51) Int. Cl.
*G06F 3/00*    (2006.01)

(52) U.S. Cl. .................. 715/784; 715/786; 715/785; 715/830; 715/831; 715/163; 715/157; 715/164; 715/167

(58) Field of Classification Search .............. 715/786, 715/785, 784, 830, 831, 163, 157, 164, 167, 715/866
See application file for complete search history.

(56) References Cited

U.S. PATENT DOCUMENTS

| | | | |
|---|---|---|---|
| 5,495,566 A * | 2/1996 | Kwatinetz | ................ 715/785 |
| 5,530,455 A | 6/1996 | Gillick et al. | |
| 5,633,657 A | 5/1997 | Falcon | |
| 5,877,748 A | 3/1999 | Redlich | |
| 5,943,052 A | 8/1999 | Allen et al. | |
| 5,959,614 A | 9/1999 | Ho | |
| 6,075,533 A | 6/2000 | Chang | |
| 6,097,371 A | 8/2000 | Siddiqui et al. | |
| 6,128,006 A | 10/2000 | Rosenberg et al. | |
| 6,198,473 B1 | 3/2001 | Armstrong | |
| 6,259,432 B1 | 7/2001 | Yamada et al. | |
| 6,310,607 B1 | 10/2001 | Amemiya | |
| 6,469,693 B1 | 10/2002 | Chiang et al. | |

OTHER PUBLICATIONS

Andrew Sears and Ben Shneiderman, High precision touchscreens: design strategies and comparisons with a mouse, study, Int. J. Man-Machine Studies, 1991, 34, pp. 593-613, Dept. of Computer Science and Human-Computer Interaction Laboratory, University of Maryland, College Park, MD 20742.

(Continued)

*Primary Examiner*—Weilun Lo
*Assistant Examiner*—Mylinh Tran
(74) *Attorney, Agent, or Firm*—Woodcock Washburn LLP

(57) ABSTRACT

A system and method for accelerating scrolling of a display is disclosed. When a wheel of a wheeled pointing device is actuated by a user at a first rotational rate, the display in a window scrolls up or down one line at a time. When the wheel is rotated at a second rotational rate, the display in the window scrolls up or down multiple lines at a time. In additional embodiments, the scrolling technique shifts from one line at a time/multiple lines at a time to a page or pages at a time when the wheel is rotated for at a rotational rate for a minimum period of time.

5 Claims, 4 Drawing Sheets

OTHER PUBLICATIONS

Shumin Zhai and Paul Milgram, Human Performance Evaluation of Manipulation Schemes in Virtual Environments, paper, Proc. IEEE Virtual Reality Annual International Symposium (VRAIS), Seattle, WA, Sep. 1993, Dept. of Industrial Engineering, Univ. of Toronto, Toronto, Canada M5S 1A4.

Andrew Sears, Catherine Plaisant, Ben Shneiderman, A New Era for High Precision Touchscreens, paper, Human-Computer Interaction Laboratory & Department of Computer Science, University of Maryland, Jun. 1990, pp. 1-33.

Ken Hinckley, John C. Goble, Randy Pausch, Neal F. Kassell, New Applications for the Touchscreen in 2D and 3D Medical Imaging Workstations, paper, Proc. SPIE Medical Imaging '95, University of Virginia, Charlottesville, VA 22903, 10 pp.

Shumin Zhai, Barton A. Smith, Ted Selker, Improving Browsing Performance: A study of four input devices for scrolling and pointing tasks, paper, Proceedings of INTERACT97: The Sixth IFIP Conference on Human-Computer Interaction, Sydney, Australia, Jul. 14-18, pp. 286-292.

Shumin Zhai, Ph.D., Human Performance in Six Degree of Freedom Input Control, thesis, Ergonomics in Teleoperation and Control Lab, Dept. of Industrial Engineering, University of Toronto, 1995, 227 pp.

George G. Robertson, Stuart K. Card, and Jock D. MacKinlay, The Cognitive Coprocessor Architecture for Interactive User Interfaces, paper, Xerox Palo Alto Research Center, 333 Coyote Hill Road, Palo Alto, CA 94304, 1989, pp. 10-18.

I. Scott Mackenzie, Input Devices and Interaction Techniques for Advanced Computing, paper, In W. Barfield, & T.A. Furness III (Eds.), Virtual environments and advanced interface design, 1995, pp. 437-470. Oxford, UK: Oxford University Press.

Herbert D. Jellinek, Stuart K. Card, Powermice and User Performance, paper, Xerox Palo Alto Research Center, 3333 Coyote Hill Road, Palo Alto, CA 94304, CHI '90 Proceedings, Apr. 1990, pp. 213-220.

\* cited by examiner

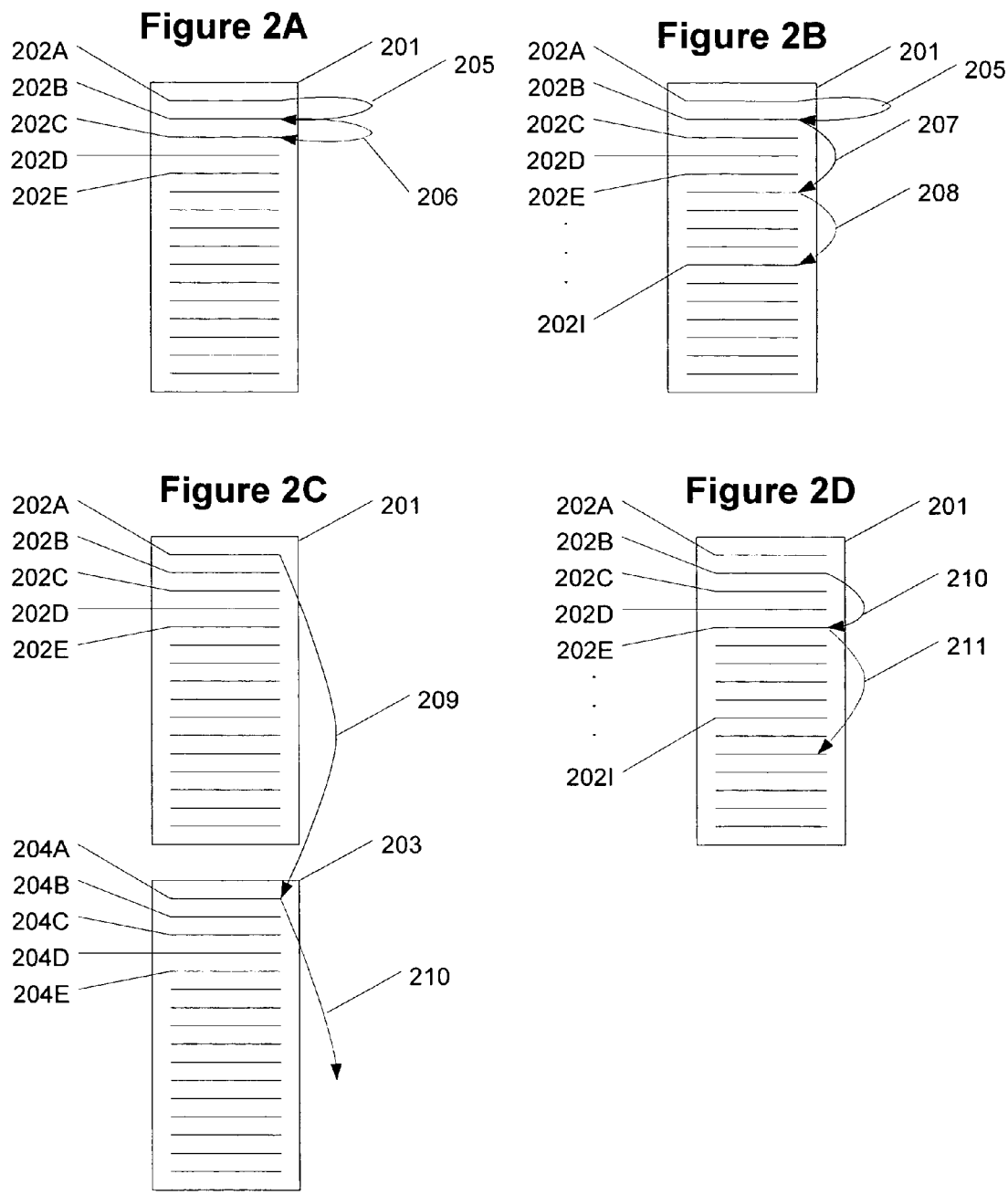

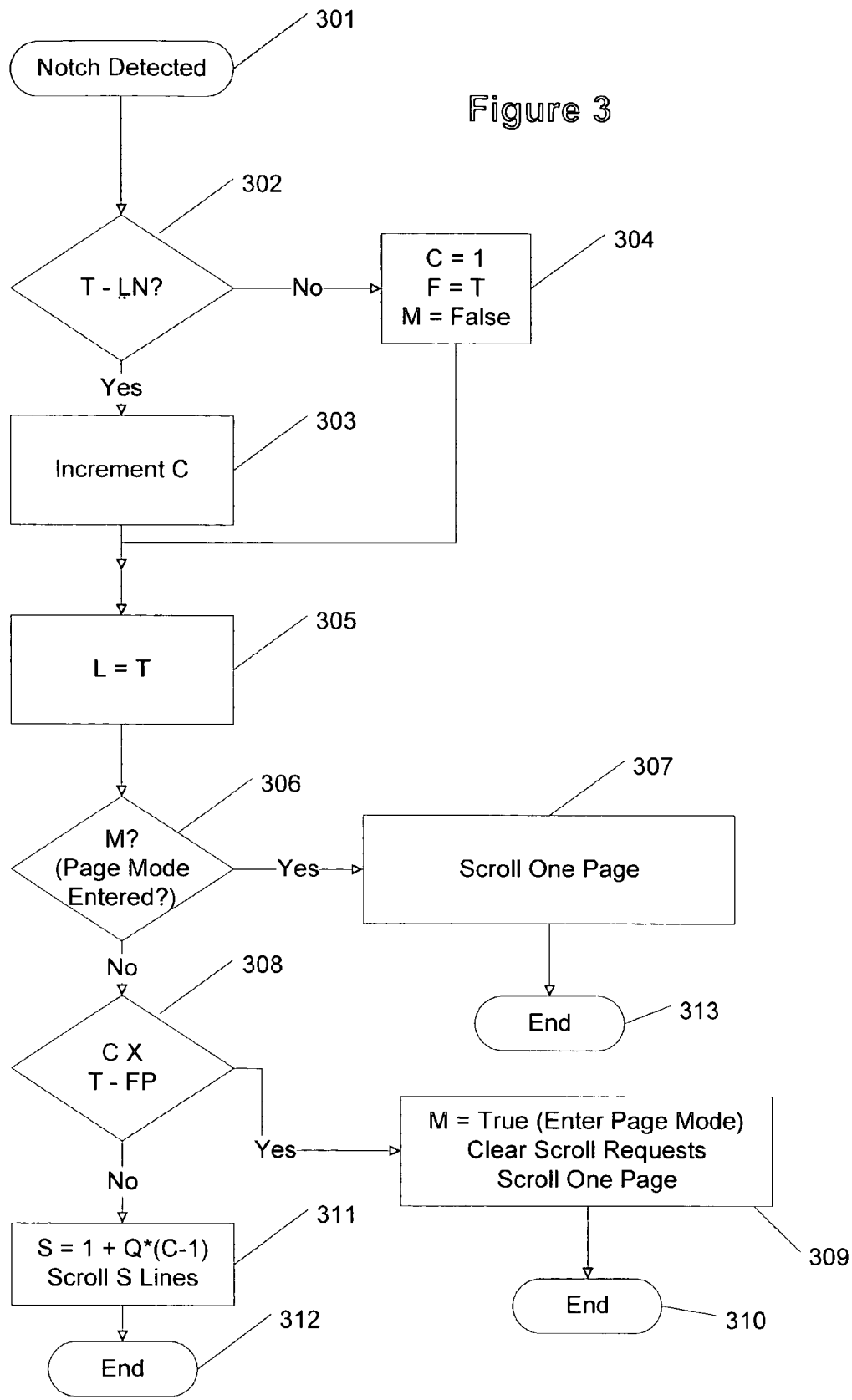

ACCELERATED SCROLLING

This is a Divisional Application of co-pending U.S. patent application Ser. No. 09/407,946 filed Sep. 29, 1999 in which the contents of said application are hereby incorporated herein by reference.

BACKGROUND

1. Technical Field

The disclosure generally relates to user actuated pointing devices for use with a computer. More particularly, the disclosure relates to enhancing the scrolling schema of wheeled mice.

2. Related Art

The computer mouse has simplified the computer-human interface. Before the computer mouse, many users were confined to interacting with a computer through the use of a command line interface (CLI as is known in the art). The computer mouse (also commonly referred to simply as "the mouse") has, in recent years, been improved upon with the inclusion of a wheel on the top of the mouse. An example of a wheeled mouse is shown in FIG. 1. The function of the wheel 106 is to scroll the text or document or image located below a displayed cursor 113 shown on a visual display device 112. The wheel is preferably linked to an optically encoded wheel for sensing the rotational location of the wheel 106. To allow for feedback to the user, the wheel contains a number of notches (not shown for simplicity). When rotated, a user is presented with tactile feedback of the distance rotated through sensing the number of notches rotated by the wheel. The function of the wheel 106 is interpreted through signals sent from mouse 101 through cable 110 to computer 109 having memory 114 and processor 115. Shown for completeness is keyboard 116, which is generally used in combination with mouse 101 for various operations as are known in the art. For example, rotating the wheel away from the user may scroll the underlying displayed content down so as to show another portion of the displayed content immediately preceding the originally displayed content. Likewise, rotating the wheel toward the user may scroll the underlying displayed content up.

A user may specify a scrolling mode of either scrolling by a fixed number of lines (referred to herein as the "line-scrolling mode") or scrolling by page (referred to herein as the "page-scrolling mode). To change from one scrolling mode, or to modify the number of lines to scroll in the line-scrolling mode, a user navigates a series of windows to a preferences option list for the wheeled mouse. In general, the preferences page allows selection of the scrolling mode as well as a designation of the number of lines when a line-scrolling mode is selected.

Other features of a wheeled mouse and alternative techniques of navigating a display through the use of the wheeled mouse are disclosed in U.S. Ser. No. 09/212,898, filed Dec. 16, 1998, for "System and Method of Adjusting Display Characteristics of a Displayable Data File Using An Ergonomic Computer Input Device," whose contents are incorporated herein by reference.

Scrolling through a document via the wheel on a wheeled mouse is helpful in that it provides useful document handling without the need to access the keyboard or predefined scroll bars. However, as a document's size changes or the needs of a user change (for example, from drafting a document to editing or reviewing a completed draft), the user may desire to change the scrolling mode. Changing modes requires navigating to a mouse preferences page, switching the scrolling mode, changing (when appropriate) the number of lines to scroll with every rotational notch in the wheel, and finally returning to the underlying document. These combinations of steps detract from the ease of using the scrolling feature of a wheeled mouse. Accordingly, an easier technique for switching between scrolling modes is needed.

SUMMARY

An improved scrolling technique is disclosed. Through monitoring the rotational speed of the wheel as well as the number of notches through which it is rotated, the scrolling mode is modified. At a slow rotational spread, one line is scrolled per notch on the wheel. Rotating faster increases the number of lines to be scrolled from one line per notch to a predefined number (for example, three) lines per notch or an increasing number of lines per notch (for example, four, seven, eleven, etc.). By rotating through a number of notches within a given time interval, the scrolling mode changes from a number of lines per notch to a page (or pages) per notch.

In various embodiments, the following may be predefined and/or set by the user: the rotational speed (or time between notches) at which the system switches from scrolling one line per notch to scrolling multiple lines per notch, the number of lines to scroll at the multiple lines per notch rate or the number of lines to increase the scrolling of multiple lines by with each notch, the number of notches through which a user needs to scroll before switching to the page scrolling mode, and the time between the first notch and the last notch in a series to trigger the page scrolling mode.

The invention is described in terms of a computer mouse having a wheel. However, it will be recognized that other input forms may be used including trackballs with a separate wheel, trackballs with a separate function for accelerated scrolling, tablets with a wheel, and any other input device having an input that allows for rotation. Further, while the disclosure includes references to notches on a wheel, it is appreciated that any scrolling input may be used including a scroll feature of a computer input device without notches, but rather by distance traveled by the rotating scrolling element.

These and other novel advantages, details, embodiments, features and objects of the present invention will be apparent to those skilled in the art from following the detailed description of the invention, the attached claims and accompanying drawings, listed herein, which are useful in explaining the invention.

BRIEF DESCRIPTION OF DRAWINGS

FIGS. 2A through 2D show documents navigated through accelerated scrolling in accordance with embodiments of the invention.

FIG. 3 shows process steps that determine when different scrolling modes are to be entered.

DETAILED DESCRIPTION

Figure 1A:
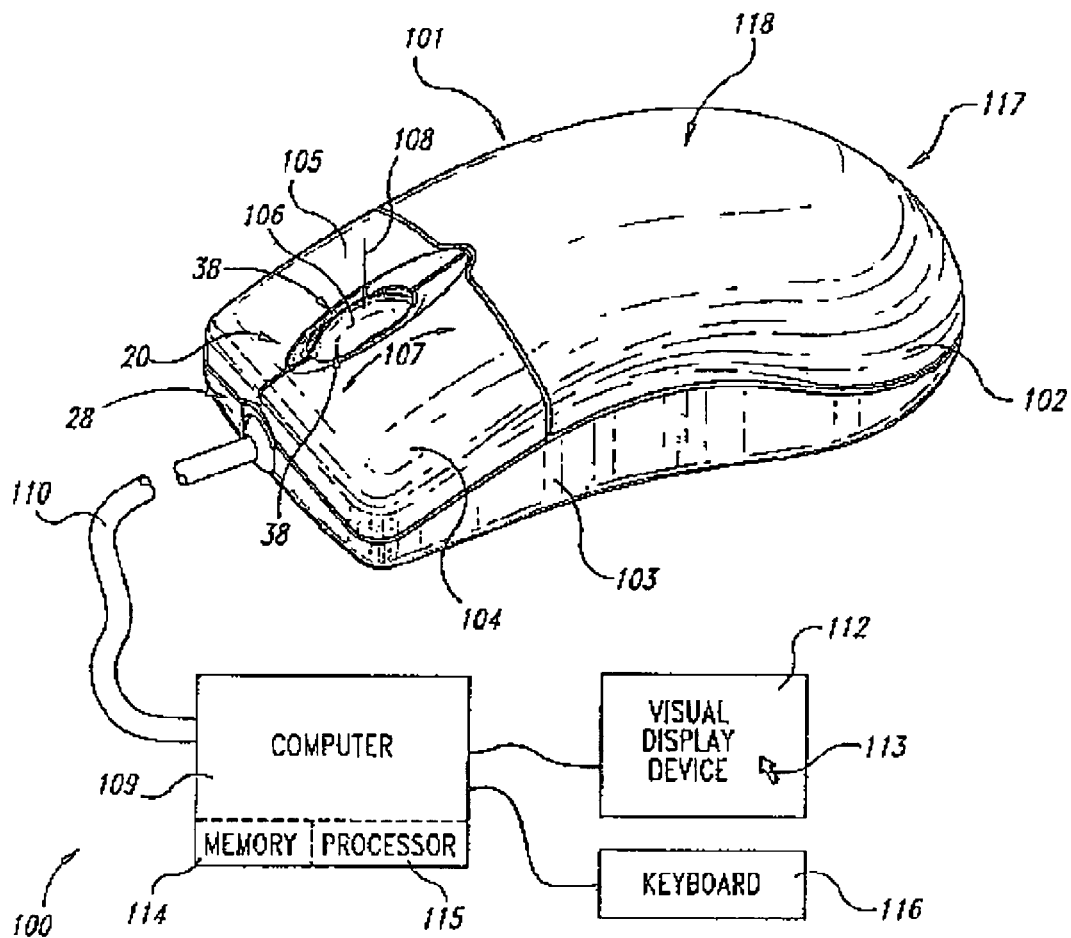
FIGS. 1A and 1B show a mouse having a wheel.
Figure 1B:
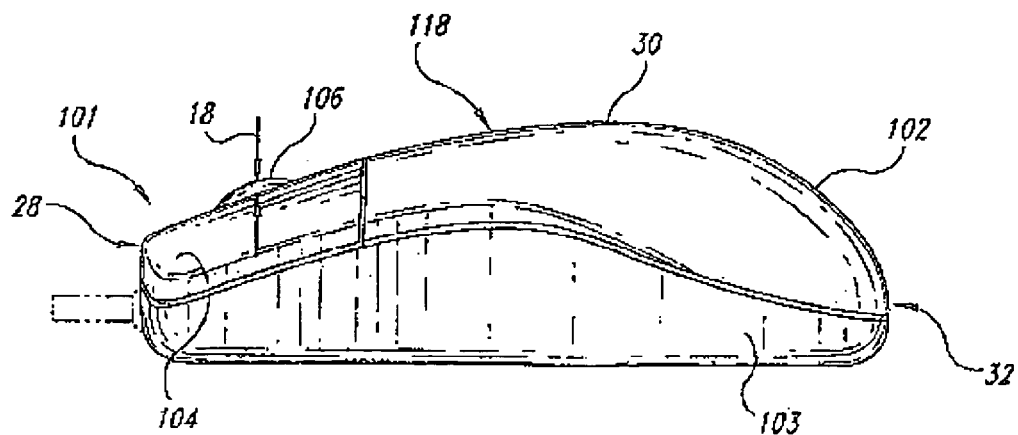

The present invention relates to accelerating the scrolling feature of wheeled mice. While the invention is described in relation to scrolling through a document, it is appreciated that any content may be used including, but not limited to, pages from the Internet, images, spreadsheets, calendars, and kind of windows that have scroll bars. Also, scrolling through non-viewable media is also considered part of the invention including scrolling through audio and video files. The invention may be practiced using C. Also, it is appreciated that other languages may be used including C++, assembly language, and the like.

In general, the distance scrolled through a document depends on the speed and length of the rotation of the wheel. When the wheel is rotated slowly, the document scrolls a single line per notch. When the wheel is rotated at a greater speed, the document scrolls at multiple lines per notch. When the wheel is rotated for a predetermined number of notches in short enough time, the scrolling technique shifts to scrolling a page at a time.

FIG. 2A shows document 201 with lines 202A, 202B, 202C, 202D, 202E, etc. These lines are shown starting at the top of the document but may be referenced anywhere in the document as scrolling through the document may be considered a relative movement as opposed to an absolute movement.

FIG. 2A provides an example of scrolling one line at a time. Here, the wheel 106 is rotated below a predefined rate. For example, this rate may be 150 ms per notch. As shown in FIG. 2A, a viewable portion 201 of a document including a number of lines 202A, 202B, etc. is shown. In some embodiments, viewable portion 201 may represent a page of textual document, where the page is larger then a user's screen. In other embodiments, it may represent the image itself that is displayed on a user's screen. When scrolled down, the displayed image is moved up in relation to the image displayed on the user's display device 112. Scrolling the first line is represented by arrow 205. Scrolling a second line (actuated by scrolling through a second notch) is represented through arrow 206. This may repeat as long as the rotational rate of the wheel is below the predefined rate.

FIG. 2B shows the scrolling mode shifting from one line per notch to multiple lines per notch. Here, the number of lines scrolled per notch is three. However, it is appreciated that any number of lines may be specified per a predefined value or user preference.

The scrolling of three lines per notch is shown through the arrows 207 and 208. Arrow 205 remains resident on FIG. 2B as this reflects that the document was scrolled one line prior to entry to the multiple line-scrolling mode. In an alternative embodiment, the execution of the scrolling through one line (205) may be delayed for a short time period (for example, the predefined time described above of 150 ms) to see if additional scrolling requests have been received by the computer system.

FIG. 2C shows lines 202A through 202E on document 201 as described with respect to FIG. 2A. Here, each scrolling request results in a scrolling of a page. When rotated a notch, the displayed image shifts from page 201 to page 203 as reflected by arrow 09. Rotating the wheel to the next notch results in scrolling to the next page as represented by arrow 210. As described above, page 201 may comprise the viewable portion of a user's display. Alternatively, it may comprise a physical page in the displayed document of which only a portion is displayed at any given time.

FIG. 2D, similar to FIG. 2B above, shows scrolling with an increasing number of lines per scroll. Here, arrows 210 and 211 show an increasing number of lines scrolled per notch.

FIG. 3 relates to a process for determining whether to change scrolling modes. The following provides a list of the variables used in relation to the flowchart as shown in FIG. 3:

T=current time
L=time of last notch
F=time of first notch in series
X=index of notch where page time check occurs
N=maximum time between two notches in a series
P=maximum time between first and x-th notch to trigger page scroll mode
M=a flag indicating whether page scroll mode has been entered
S=number of lines to scroll in this request
Q=number of lines to add to S at each notch in series The variables X, N, P, and Q may be predefined in the system. Alternatively, they may be available for user modification through setting of preferences for the scrolling function. In this situations, a user may navigate a series of windows to a scrolling preferences page where the modifications to the values of the variables may be made. This is shown in greater detail with respect to FIG. 4, described below.

As to variable F, the series may be defined as beginning with a notch after a pause of a predetermined interval, for example, 1 second.

Referring to FIG. 3, once a notch is detected at step 301, step 302 is executed in which it is determined whether the difference in time between the current time and the time of the last notch is less than or equal to the value N (the maximum preset time between two notches in a series in order to shift to the multiple line scrolling mode). If no, the counter C is set to 1, the variable F (the time of the first notch in a series) is set to the current time, and the page mode flag M is set to false (step 304). If yes to step 302, C is incremented in step 303. The time of the last notch L is set to the current time T in step 305.

Next, in step 306, it is determined whether page mode has been entered (by determining whether flag M has been set to true). If yes, the system scrolls one page (step 307) then ends this module (step 313) and waits for another notch. If no, the system checks whether the number of notches in the series C is greater than or equal to X. X represents the number of notches at which the system checks to see if the page scrolling mode should be entered. If yes, step 309 is executed in which the flag M is set to true (indicating that the page mode should be entered), pending scroll requests are cleared, and the command to scroll one page is executed. Step 309 is followed by step 310 where the system waits for the next notch. If no, step 311 is executed where it is determined how many lines to scroll by the following equation: $S=1+Q*(C-1)$. Next, S lines are scrolled. Finally, step 312 is executed where the system waits for the next notch.

If a stream of slow notches is received, the system will scroll one notch at a time. If a stream of fast notches is received, the scrolling will be as follows: scroll one line, scroll four lines, scroll seven lines, etc. (in this example, Q=3). Here, each new notch (provided that the page mode has not been entered) results in a scrolling of an increasing number of lines.

In an alternate embodiment, the system may scroll a fixed number of lines per new notch in the multiple page mode. Here, the equation for S may be S=1 for C=1; S=Q for C>1.

Figure 4:
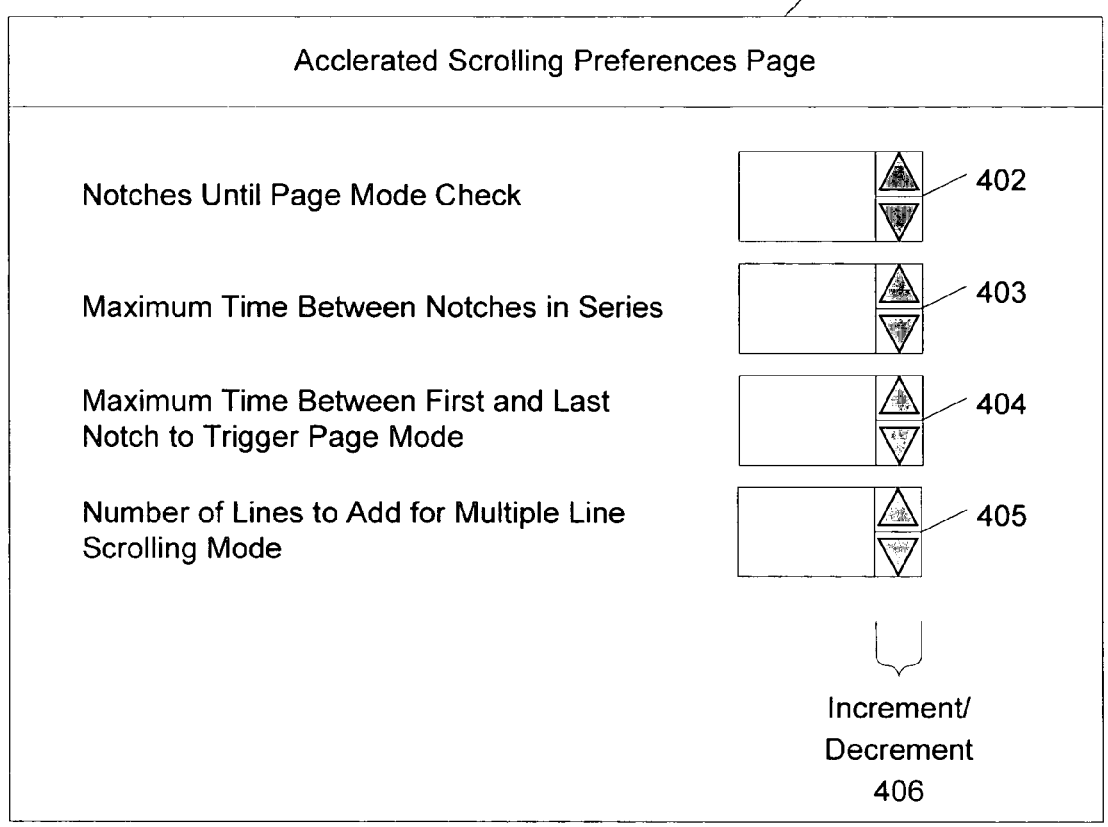
FIG. 4 shows a user interface for modifying user preferences in accordance with embodiments of the present invention.

FIG. 4 shows a preferences page for setting of values for accelerated scrolling characteristics defined herein. The page 401 shows the areas 402-405 for setting of the values of variables X, N, P, and Q, respectively. Initial values for these variables may be as follows:

X=4
N=130 ms
P=80 ms
Q=3

It will be appreciated that the above values are given by example. Alternative values may be used. Further, as to the values of N and P, these may be given, not in milliseconds, but rather in iterations of the screen refresh rate. For example, using a 60 Hz refresh rate, N may be set at 8/60. At a 75 Hz refresh rate, N may be set to 10/75 for a similar response. The shifting of the values (for instance, N and P) in order to maintain similar time values may be made automatically in accordance with the changing of refresh rates (e.g., changing from 60 Hz to 75 Hz).

Finally, while not shown in FIG. 4, another preference box may be included to allow for scrolling of multiple pages per notch.

In the examples described herein, the scrolling is shown in the down direction. Scrolling in the up direction is equally part of the invention. Also, in the case of additional scrolling wheels being added to mice, scrolling side to side is equally appreciated. Further, multiple acceleration directions (including side-to-side) may be achieved through using the above described acceleration for a single wheel in combination with another mouse button or the like.

For example, the above-described invention may be practiced through accelerated scrolling in the Y-direction (up and down) through normal operation of the wheel. Accelerated scrolling in the X or Z directions may be practiced through depression of the wheel or another mouse button.

Embodiments include queuing each scroll request for execution. Alternative embodiments include pre-processing the scroll requests (for example, for scrolling in different directions) so as to eliminate conflicting scroll requests. An example of the latter is the system receiving scroll requests to scroll down (for instance, scroll down 7 lines) immediately followed by scroll requests to scroll up (for instance, scroll up 3 lines). The system may pre-process the scroll requests to minimize the scrolling as shown to the user (for instance, scroll down 4 lines).

The above-described system may be used in a plurality of different signaling techniques including USB (universal serial bus), PS/2, Logitech, and the like that are applicable to mice control. The USB signaling technique is described herein for reference. Other signaling techniques may be used as are known in the art. The USB signaling technique includes four bytes. The first and second bytes are generally reserved for X and Y movement signals, respectively. The third byte relates to operation of the buttons of the mouse. The fourth byte may be tied to operation of the wheel in which the rotational position of the wheel is transmitted in this fourth byte.

Alternate embodiments of the USB signally technique exist. For example, the mouse may have integrated firmware in which the fourth byte provides the rest of the computer system with the number of lines to scroll rather than the absolute position of the wheel 106. Also, the mouse may include an accelerometer in the wheel. Here, the mouse may transmit actual accelerometer data to the rest of the system rather than a wheel position. Finally, the mouse may determine in which scrolling mode in which to operate and transmit this information to the remainder of the computing system.

In the foregoing specification, the present invention has been described with reference to specific exemplary embodiments thereof. Although the invention has been described in terms of various embodiments, those skilled in the art will recognize that various modifications, embodiments or variations of the invention can be practiced within the spirit and scope of the invention as set forth in the appended claims. All are considered within the sphere, spirit, and scope of the invention. The specification and drawings are, therefore, to be regarded in an illustrative rather than restrictive sense.

Accordingly, it is not intended that the invention be limited except as may be necessary in view of the appended claims.

The invention claimed is:

1. A computer-readable storage medium having stored thereon a computer program for enhancing scrolling schema, said program when executed enables a user-interface for specifying preferences for scrolling of a display comprising:
    a first data field for receiving data indicative of a time when a first notch is being detected;
    a second data field for receiving data indicative of a time when a second notch is being detected;
    means for determining a maximum time between the first and second notches so as to consider said first and second notches to be in a series, wherein the series is defined as beginning with the first notch after a pause of a predetermined interval;
    a third data field for receiving data indicative of said maximum time between the first and the second notch received in said series;
    a fourth data field for receiving a number of lines to automatically add for each additional notch received in said series;
    means for determining a number of rotated notches required to automatically enter a page scrolling mode;
    means for determining a number of rotated notches required to automatically enter a plural-line scrolling mode, wherein the number of rotated notches to enter the plural-line scrolling mode is less than the number of rotated notches to enter the page scrolling mode;
    means for determining a number of rotated notches required to automatically enter a single-line scrolling mode, wherein the number of rotated notches to enter the single-line scrolling mode is less than the number of rotated notches to enter the plural-line scrolling mode;
    a fifth data field for receiving data indicative of said number of rotated notches to enter each of the scrolling modes;
    a flag for indicating that the page scrolling mode has been entered based on the data received in the fifth data field;
    means for scrolling said display according to the page scrolling mode in which each notch always scrolls a subsequent or immediately preceding page based on a direction of movement of the notch until the maximum amount of time interval between the first notch and the second notch falls below a predetermined amount of time;
    means for scrolling said display according to the plural-line scrolling mode in which each notch scrolls multiple lines; and
    means for scrolling said display according to the single-line scrolling mode in which each notch scrolls a single line.

2. The computer-readable storage medium of claim 1, wherein the user-interface further comprising a sixth data field for receiving the number of lines to add for each additional notch received in said series.

3. The computer-readable storage medium of claim 1, wherein the user-interface further comprising a sixth data field adjacent to the fourth data field, the sixth data field for receiving user input to manipulate the data of the fourth data field.

4. The computer-readable storage medium of claim 1, wherein the user-interface further comprising a sixth data field adjacent to the fifth data field, the sixth data field for receiving user input to manipulate the data of the fifth data field.

5. A computer-readable storage medium having stored thereon a computer program for enhancing scrolling schema, said program when executed enables a user-interface for specifying preferences for scrolling of a display comprising:

- a first data field for receiving data indicative of a time when a first notch is being detected;
- a second data field for receiving data indicative of a time when a last notch is being detected;
- means for determining a number of rotated notches within a given time interval required to automatically enter in to a page scrolling mode;
- means for determining a number of rotated notches within a given time interval required to automatically enter in to a plural-line scrolling mode, wherein the number of rotated notches to enter the plural-line scrolling mode is less than the number of rotated notches to enter the page scrolling mode;
- means for determining a number of rotated notches within a given time interval required to automatically enter in to a single-line scrolling mode, wherein the number of rotated notches to enter the single-line scrolling mode is less than the number of rotated notches to enter the plural-line scrolling mode;
- a third data field for receiving data indicative of the number of said rotated notches to enter each of the scrolling modes;
- a fourth data field for receiving data indicative of a maximum amount of time between the first notch and the last notch as determined by the entry in said third data field so as to automatically enter in to said page scrolling mode;
- a fifth data field for receiving data indicative of a maximum time between the first and last notches so as to consider said notches to be in a series;
- a sixth data field adjacent to the third data field, the sixth data field for receiving user input to manipulate the data of the third data field;
- a seventh data field adjacent to the fourth data field, the seventh data field for receiving user input to manipulate the data of the fourth data field;
- a flag for indicating that the page scrolling mode has been entered;
- means for scrolling said display according to the page scrolling mode in which each notch always scrolls a subsequent or immediately preceding page based on a direction of movement of the notch until the maximum amount of time interval between the first notch and the last notch falls below a predetermined amount of time;
- means for scrolling said display according to the plural-line scrolling mode in which each notch scrolls multiple lines; and
- means for scrolling said display according to the single-line scrolling mode in which each notch scrolls a single line.

\* \* \* \* \*